Figure 1:
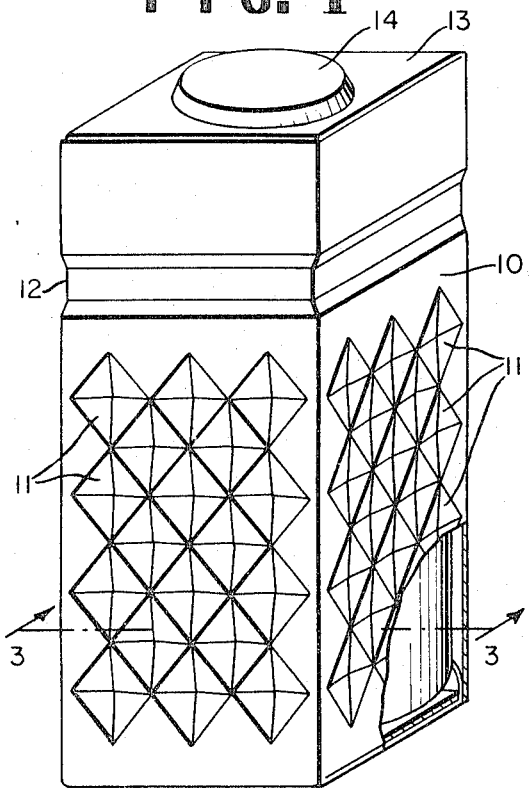
Figure 2:
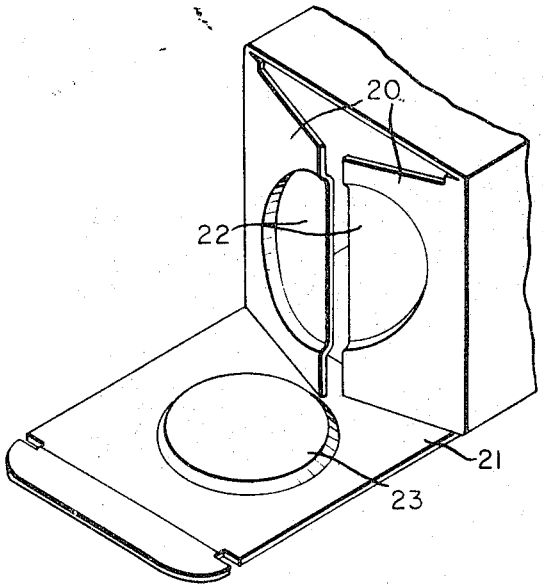
Figure 3:
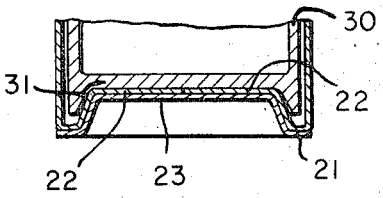
Figure 3A:
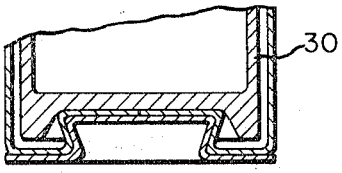
Figure 4:
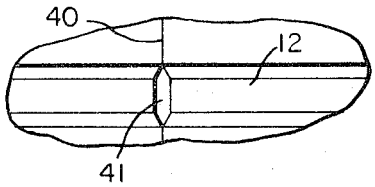
Figure 5:
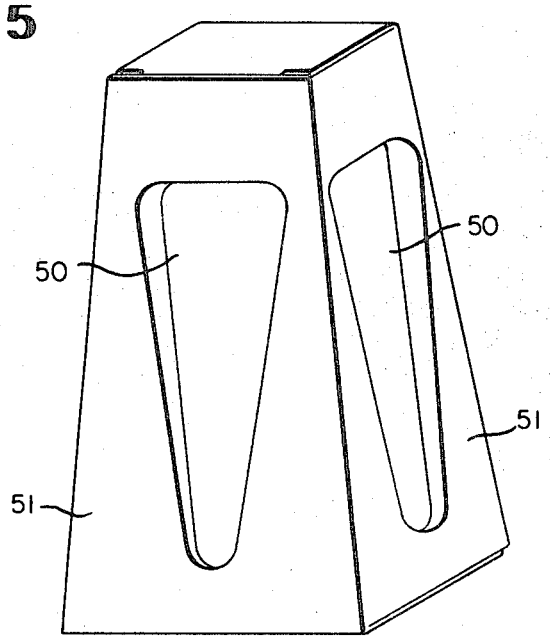
Figure 6:
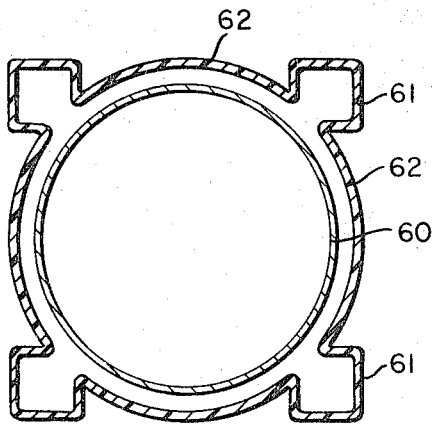
Figure 7:
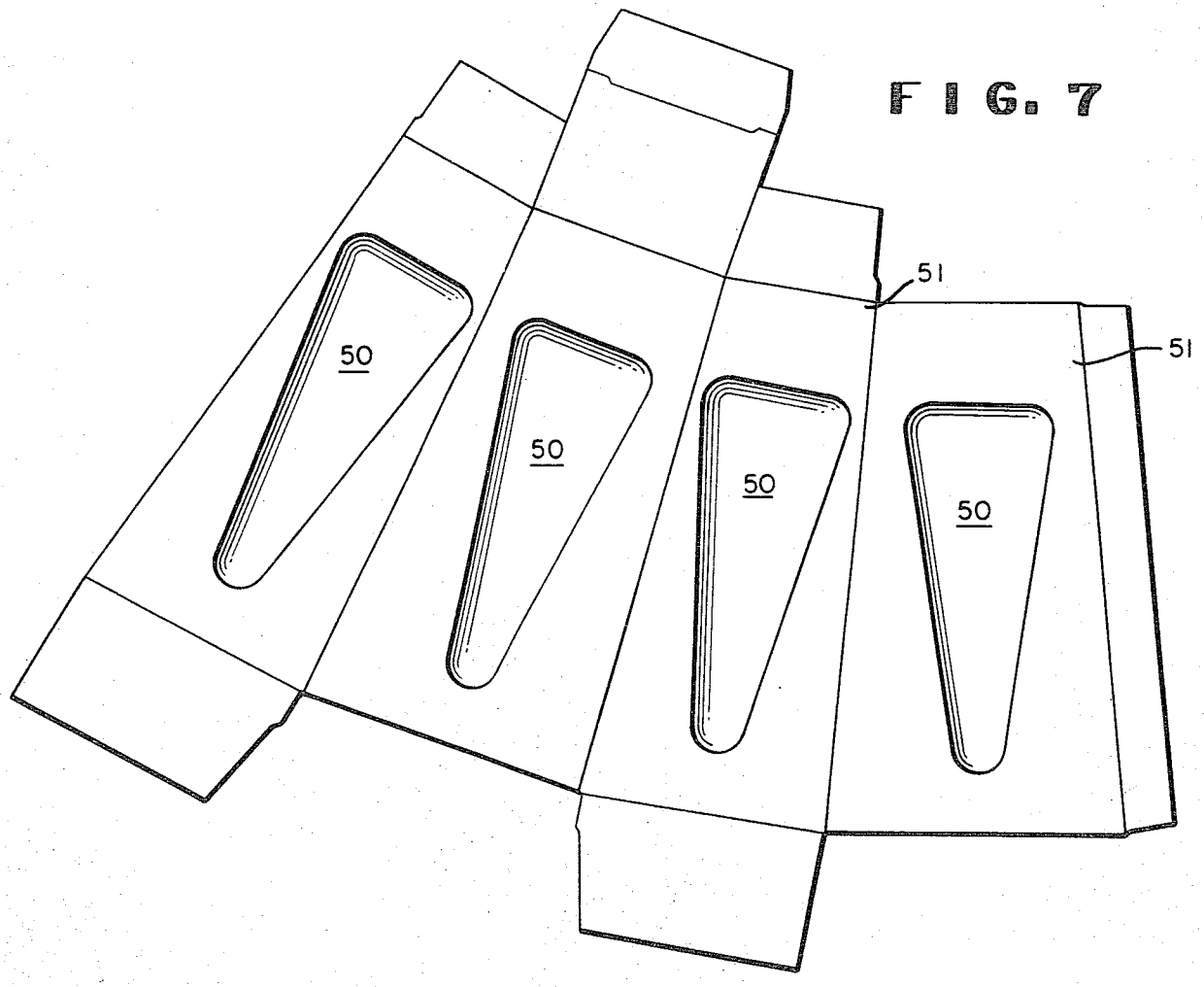

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 6

T901,002

THERMOFORMED PACKAGES

Richard G. Gelak, Cherry Hill, and Vero Ricci, Collingswood, N.J., assignors to E. I. du Pont de Nemours and Company, Wilmington, Del.

Continuation of abandoned application Ser. No. 852,178, Aug. 22, 1969. This application Jan. 13, 1971, Ser. No. 106,241

Int. Cl. B65d *85/00*

U.S. Cl. 206—46 FC

3 Sheets Drawing. 8 Pages Specification

A thermoplastic carton blank having at least one surface thermoformed, preferably the top or bottom, to conform to the contours of the article to be packaged in the carton made from the blank. The carton blank is scored, creased and then folded into a carton particularly useful in packaging articles that could be broken or marred in the absence of an outer wrap such as glass container, breakable plastics, polished metal, ceramic metals, delicate instruments and the like. The thermoformed portion of the surface of the carton assists in restraining movements of the packaged article and the thermoplastic material cushions the article.

The thermoplastic material preferably is a laminate of (a) a core of oriented closed cell foam having an elongation of less than about 50% and consisting essentially of styrene polymer having a tensile modulus greater than 150,000 p.s.i., and (b) bonded to both sides of the core is a thermoplastic film having a tensile modulus greater than 150,000, a percent elongation at break greater than the function $t \div R$ where $t$ is the thickness of the film and R is the radius of a creasing edge when the carton blank is

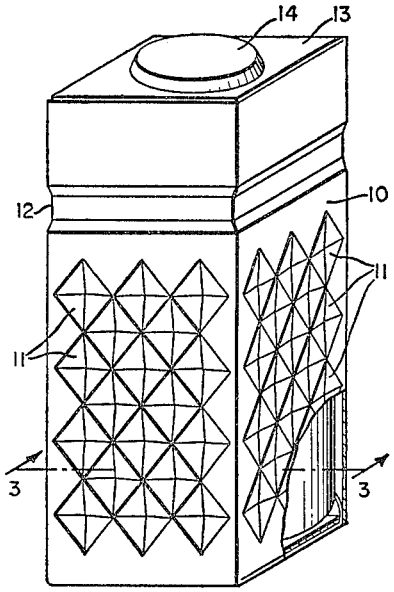

folded and is thermoformable within a temperature range of about 50° to 230° C.

THERMOFORMED PACKAGES

Original Filed Aug. 22, 1969 3 Sheets-Sheet 1

INVENTORS
RICHARD G. GELAK
VERO RICCI
BY Donald W. Huntley
ATTORNEY

THERMOFORMED PACKAGES

Original Filed Aug. 22, 1969 3 Sheets-Sheet 2

INVENTORS
RICHARD G. GELAK
VERO RICCI
BY Donald W. Huntley
ATTORNEY

THERMOFORMED PACKAGES

Original Filed Aug. 22, 1969 3 Sheets-Sheet 3

INVENTORS
RICHARD G. GELAK
VERO RICCI
BY Donald W. Huntley
ATTORNEY